(12) United States Patent
Furushige et al.

(10) Patent No.: US 9,703,362 B2
(45) Date of Patent: Jul. 11, 2017

(54) ELECTRONIC DEVICE AND METHOD FOR POWER SUPPLY CONTROL

(71) Applicant: KYOCERA Document Solutions Inc., Osaka (JP)

(72) Inventors: Katsuji Furushige, Osaka (JP); Masaya Okuda, Osaka (JP); Masato Hirota, Osaka (JP)

(73) Assignee: KYOCERA Document Solutions Inc. (JP)

( * ) Notice: Subject to any disclaimer, the term of this patent is extended or adjusted under 35 U.S.C. 154(b) by 198 days.

(21) Appl. No.: 14/552,545

(22) Filed: Nov. 25, 2014

(65) Prior Publication Data
US 2015/0153814 A1 Jun. 4, 2015

(30) Foreign Application Priority Data
Nov. 29, 2013 (JP) .................................. 2013-248550

(51) Int. Cl.
G06F 15/177 (2006.01)
G06F 1/32 (2006.01)
G03G 15/00 (2006.01)

(52) U.S. Cl.
CPC ....... *G06F 1/3284* (2013.01); *G03G 15/5004* (2013.01); *G03G 15/5016* (2013.01); *G06F 1/3287* (2013.01)

(58) Field of Classification Search
CPC ........ G06F 1/32; G06F 1/3287; G06F 1/3284; G06F 1/3206; G03G 15/5004; G03G 15/5016
See application file for complete search history.

(56) References Cited

U.S. PATENT DOCUMENTS 8,321,702 B2* 11/2012 Kaneko ................. G06F 1/3203
713/320
9,350,890 B2* 5/2016 Shintani ............. H04N 1/00928
(Continued)

FOREIGN PATENT DOCUMENTS

CN 101005551 A 7/2007
JP 2008-160413 A 7/2008
(Continued)

OTHER PUBLICATIONS

European Search Report and Opinion for App. No. EP 14194922.2, mailed Aug. 20, 2015.
(Continued)

*Primary Examiner* — Fahmida Rahman
(74) *Attorney, Agent, or Firm* — McDonnell Boehnen Hulbert & Berghoff LLP

(57) ABSTRACT

An electronic device includes a power supply unit, a to-be-used function setting unit, and a function-specific power supply control unit. The power supply unit supplies electric power to a constituent unit of the electronic device from a main power source. The to-be-used function setting unit sets functions to be used when the main power source is turned on. The function-specific power supply control unit controls the power supply unit to a) supply electric power to a constituent unit corresponding to a function that has been set by the to-be-used function setting unit when the main power source is turned on and b) supply electric power to a constituent unit corresponding to a function that has not been set by the to-be-used function setting unit when the function that has not been set is selected after turning on the main power source.

10 Claims, 7 Drawing Sheets

(56) References Cited

U.S. PATENT DOCUMENTS

| | | | |
|---|---|---|---|
| 2006/0075150 A1* | 4/2006 | Hwang | H04N 1/00 710/14 |
| 2007/0206211 A1* | 9/2007 | Okutsu | G03G 15/50 358/1.14 |
| 2010/0241888 A1 | 9/2010 | Kaneko et al. | |
| 2011/0164895 A1 | 7/2011 | Ishikake et al. | |
| 2012/0272081 A1* | 10/2012 | Moloney | G06F 1/3206 713/323 |
| 2012/0328319 A1 | 12/2012 | Ogata et al. | |
| 2013/0318377 A1* | 11/2013 | Furuya | G06F 1/3206 713/320 |

FOREIGN PATENT DOCUMENTS

| | | |
|---|---|---|
| JP | 2010-197632 A | 9/2010 |
| JP | 2010-256939 A | 11/2010 |

OTHER PUBLICATIONS

Office Action dated Feb. 16, 2016 from the Japanese Patent Office re Japanese Patent Appl. No. 2013-248550.

Office Action dated Apr. 13, 2017 from the Chinese Patent Office re Chinese Patent Appl. No. 201410709228.8.

\* cited by examiner

| | COPY FUNCTION | | | |
|---|---|---|---|---|
| TO-BE-USED FUNCTION SETTING INFORMATION | NOT USED | NOT USED IMMEDIATELY | USED IMMEDIATELY | AUTO-SETTING |
| ORIGINAL READING UNIT | | | POWER SUPPLY | |
| IMAGE FORMING UNIT AND CONVEYING UNIT | | | POWER SUPPLY | |
| MANIPULATION PANEL | | POWER SUPPLY | POWER SUPPLY | |
| NETWORK TRANSMISSION AND RECEPTION UNIT | | | | |
| FACSIMILE TRANSMISSION AND RECEPTION UNIT | | | | |
| | FACSIMILE FUNCTION | | | |
| TO-BE-USED FUNCTION SETTING INFORMATION | NOT USED | NOT USED IMMEDIATELY | USED IMMEDIATELY | AUTO-SETTING |
| ORIGINAL READING UNIT | | | | POWER SUPPLY |
| IMAGE FORMING UNIT AND CONVEYING UNIT | | | | |
| MANIPULATION PANEL | | | POWER SUPPLY | POWER SUPPLY |
| NETWORK TRANSMISSION AND RECEPTION UNIT | | | | POWER SUPPLY |
| FACSIMILE TRANSMISSION AND RECEPTION UNIT | | | | |
| | OTHER TRANSMISSION FUNCTIONS | | | |
| TO-BE-USED FUNCTION SETTING INFORMATION | NOT USED | NOT USED IMMEDIATELY | USED IMMEDIATELY | AUTO-SETTING |
| ORIGINAL READING UNIT | | | | |
| IMAGE FORMING UNIT AND CONVEYING UNIT | | | | |
| MANIPULATION PANEL | | | POWER SUPPLY | POWER SUPPLY |
| NETWORK TRANSMISSION AND RECEPTION UNIT | | | | |
| FACSIMILE TRANSMISSION AND RECEPTION UNIT | | | | POWER SUPPLY |
| | PRINT FUNCTION | | | |
| TO-BE-USED FUNCTION SETTING INFORMATION | NOT USED | NOT USED IMMEDIATELY | USED IMMEDIATELY | AUTO-SETTING |
| ORIGINAL READING UNIT | | | | |
| IMAGE FORMING UNIT AND CONVEYING UNIT | | | POWER SUPPLY | |
| MANIPULATION PANEL | | | | |
| NETWORK TRANSMISSION AND RECEPTION UNIT | | POWER SUPPLY | POWER SUPPLY | |
| FACSIMILE TRANSMISSION AND RECEPTION UNIT | | | | |

Fig. 4

ELECTRONIC DEVICE AND METHOD FOR POWER SUPPLY CONTROL

REFERENCE TO RELATED APPLICATIONS

This application is based upon and claims the benefit of priority from the corresponding Japanese Patent Application No. 2013-248550, filed in the Japan Patent Office on Nov. 29, 2013, the entire contents of which are incorporated herein by reference.

FIELD

The present disclosure relates to a power supply control method for an electronic device that supplies electric power to its constituent units.

BACKGROUND

Typical electronic devices, such as, for examples, multi-functional peripherals (MFPs) that can print documents and images and other image forming apparatuses, can supply electric power to various units in the electronic device.

In a typical image forming apparatus operable in an energy-saving mode in which an energy-saving state is enabled, each function is managed in correlation with parts and components necessary for executing the function. When the image forming apparatus returns from the energy-saving state, information about parts and components corresponding to a preset function is read and electric power is supplied to the parts and components indicated in the read information. However, a typical electronic device cannot individually control power supply to each constituent unit if the main power source is turned on in a state in which the user has not selected any function. Then, the electronic device enters a normal activation state in which electric power is supplied to all units. In this situation, power-saving efficiency is lowered because electric power is supplied to, for example, a fixing part as well.

SUMMARY

An electronic device in an embodiment of the present disclosure includes a power supply unit, a to-be-used function setting unit, and a function-specific power supply control unit. The power supply unit supplies electric power to a constituent unit of the electronic device from a main power source. The to-be-used function setting unit sets functions to be used when the main power source is turned on. The function-specific power supply control unit controls the power supply unit: a) to supply electric power to constituent units corresponding to a function that has been set by the to-be-used function setting unit when the main power source is turned on and b) supply electric power to constituent units corresponding to a function that has not been set by the to-be-used function setting unit when the function that has not been set is selected after turning on the main power source.

A power supply control method according an embodiment of the present disclosure includes: (i) supplying, via a power supply unit, electric power to constituent units of an electronic device from a main power source; (ii) setting, via a to-be-used function setting unit, functions to be used when the main power source is turned on; (iii) controlling, via a function-specific power supply control unit, the power supply unit to supply electric power to constituent units corresponding to a function that has been set by the to-be-used function setting unit when the main power source is turned on; and (iv) supplying, via the function-specific power supply control unit, the power supply unit to supply electric power to constituent units corresponding to a function that has not been set by the to-be-used function setting unit when the function that has not been set is selected after turning on the main power source.

A non-transitory computer-readable recording medium in an embodiment of the present disclosure stores a power supply control program executable by a computer. The power supply control program includes first to third program codes. The first program code causes a computer to set functions to be used when a main power source is turned on. The second program code causes the computer to supply electric power to constituent units corresponding to functions set by the first program code when the main power source is turned on. The third program code causes the computer to supply electric power to constituent units corresponding to the function that has not been set by the first program code when the function that has not been set is selected after turning on the main power source.

Additional features and advantages are described herein, and will be apparent from the following detailed description and the figures.

BRIEF DESCRIPTION OF THE DRAWINGS

All drawings are intended to illustrate some aspects and examples of the present disclosure. The drawings described are only schematic and are non-limiting, and are not necessarily drawn to scale.

FIG. 4 illustrates an example of power supply settings for each function of the image forming apparatus in FIG. 1;

FIG. 5 illustrates processes in power supply control processing executed when a main power source is turned on;

DETAILED DESCRIPTION

Various embodiments are described below with reference to the figures. It should be understood, however, that numerous variations from the depicted arrangements and functions are possible while remaining within the scope and spirit of the claims. For instance, one or more elements may be added, removed, combined, distributed, substituted, re-positioned, re-ordered, and/or otherwise changed. Further, where this description refers to one or more functions being implemented on and/or by one or more devices, one or more machines, and/or one or more networks, it should be understood that one or more of such entities could carry out one or more of such functions by themselves or in cooperation, and may do so by application of any suitable combination of hardware, firmware, and/or software. For instance, one or more processors may execute one or more sets of programming instructions as at least part of carrying out one or more of the functions described herein.

Figure 1:
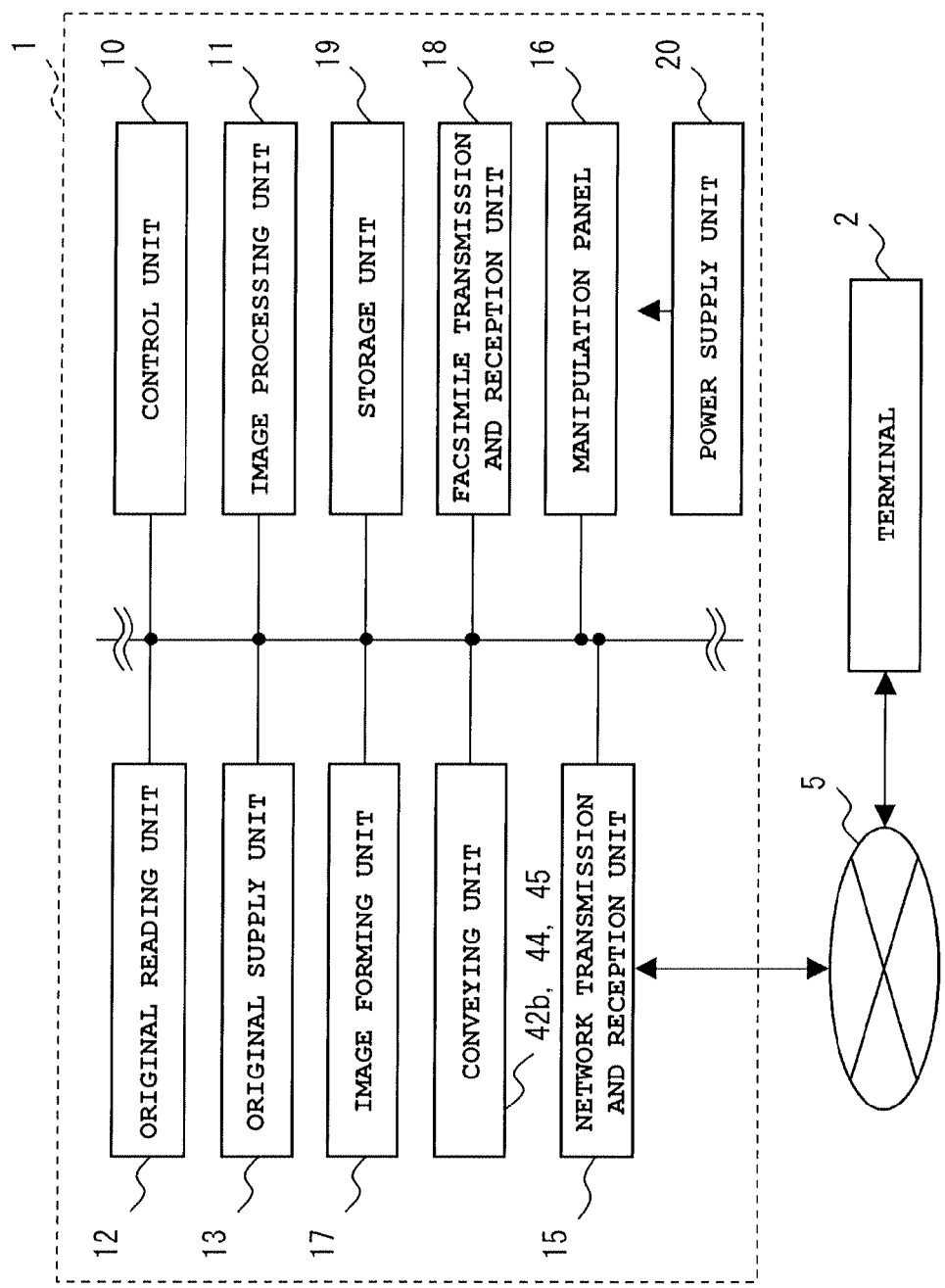
FIG. 1 is a block diagram illustrating the entire structure of an image forming apparatus according to an embodiment of the present disclosure.

The entire structure of an image forming apparatus 1 will be described first with reference to FIG. 1.

The image forming apparatus 1 is an image forming apparatus, such as an MFP or a printer, used as an electronic device in the present disclosure.

A terminal 2 is a personal computer (PC) such as a PC/AT-compatible machine, a smartphone, a mobile terminal, a tablet terminal, or another type of terminal. The terminal 2 has a display unit such as a liquid crystal display (LCD) or an organic electroluminescence (EL) panel, and also includes an input unit such as a keyboard, a mouse, or a touch panel.

The image forming apparatus 1 and terminal 2 are mutually connected to a network 5 such as a local area network (LAN), a wireless LAN, a wide area network (WAN), or a mobile telephone network.

In the image forming apparatus 1, an image processing unit 11, an original reading unit 12, an original supply unit 13, a conveying unit (formed with sheet supply rollers 42b, a conveying roller pair 44, and a discharge roller pair 45), a network transmission and reception unit 15, a manipulation panel 16, an image forming unit 17, a facsimile transmission and reception unit 18, a storage unit 19, and the like are connected to a control unit 10. The constituent units connected to the control unit 10 are controlled by the control unit 10.

The image forming apparatus 1 also has a power supply unit 20 that supplies electric power to the constituent units in the image forming apparatus 1.

The control unit 10 in the image forming apparatus 1 is a general-purpose processor (GPP), a central processing unit (CPU), a micro-processing unit (MPU), a digital signal processor (DSP), a graphics processing unit (GPU), an application-specific processor (ASIC), or another information processing device.

To implement functions that control the above individual constituent units, the control unit 10 reads out a control program stored in a read-only memory (ROM) or a hard disk drive (HDD) in the storage unit 19, stores the control program in a random-access memory (RAM), and executes the control program. The control unit 10 also controls the whole of the image forming apparatus 1, as commanded by information entered from an external terminal (not illustrated) or the manipulation panel 16.

The control unit 10 can control power supply from the power supply unit 20 to the individual constituent units. When the main power source is turned on and electric power is supplied to constituent units that have been turned off, the control unit 10 also initializes these constituent units and performs other processing on them.

The image processing unit 11 is a DSP, a GPU, or another control operation device. The image processing unit 11 performs image processing on image data, such as, for example, expansion and contraction, density adjustment, gradation adjustment, and image improvement.

The image processing unit 11 stores an image read out by the original reading unit 12 in the storage unit 19 as print data. The image processing unit 11 can also convert the print data to portable document format (PDF) or tagged image file format (TIFF) in file units before storing the print data in the storage unit 19.

The original reading unit 12 is a scanner that reads out a set original.

The original supply unit 13 is a mechanism that conveys the original read out by the original reading unit 12.

The image forming unit 17 is a device that forms an image on a recording sheet from document data in response to an output command from the user. The document data has been stored in the storage unit 19 and then read out by the original reading unit 12 or has been obtained from the terminal 2.

The conveying unit conveys a recording sheet from a sheet supply cassette 42a (see FIG. 2) to the image forming unit 17, where an image is formed on the recording sheet, and further conveys the recording sheet to a stack tray 50.

The operations of the original reading unit 12, original supply unit 13, conveying unit, and image forming unit 17 will be described later.

The network transmission and reception unit 15 is a connection device that includes a LAN board, a wireless transmission and reception unit, or the like to establish a connection to the network 5.

The network transmission and reception unit 15 transmits and receives data through a data communication line and transmits and receives voice signals through a voice telephone line.

The manipulation panel 16 includes a display unit such as an LCD or an organic EL panel, a numeric keypad, a start button, a cancel button, operation mode switching buttons to select copying, facsimile transmission, scanning and other operations, buttons to issue commands involved in the execution of jobs for example, for the printing, transmission, storage, and recording of a selected document, an input unit such as a touch panel, and the like.

The manipulation panel 16 obtains user commands for jobs performed by the image forming apparatus 1. The manipulation panel 16 can also accept or change information about each user in response to a user command obtained from the manipulation panel 16.

The facsimile transmission and reception unit 18 is, for example, a facsimile board that performs facsimile transmission and reception. The facsimile transmission and reception unit 18 is connected to an ordinary telephone line, an integrated services digital network (ISDN), or the like.

The facsimile transmission and reception unit 18 also stores received facsimile images in the storage unit 19 as print data.

The facsimile transmission and reception unit 18 may transmit the print data stored in the storage unit 19 instead of causing the image forming unit 17 to record the print data.

The storage unit 19 is a device that uses semiconductor memories such as a ROM and a RAM and also uses a recording medium such as an HDD to store data.

Even in an energy-saving state, the RAM in the storage unit 19 can retain the stored data with a self-refresh function or the like.

A control program that controls the operation of the image forming apparatus 1 is stored in the ROM or HDD in the storage unit 19. The storage unit 19 may include an area allocated for document boxes in which files of user-specific documents, images, and the like are stored.

The power supply unit 20 is a power supply device such as a switching power supply that generates a necessary voltage from a main power source such as an AC power supply and supplies the voltage to individual constituent units. The power supply unit 20 has a relay or the like so that the power supply unit 20 can individually turn on and off power supply to each constituent unit under control of the control unit 10.

Figure 2:
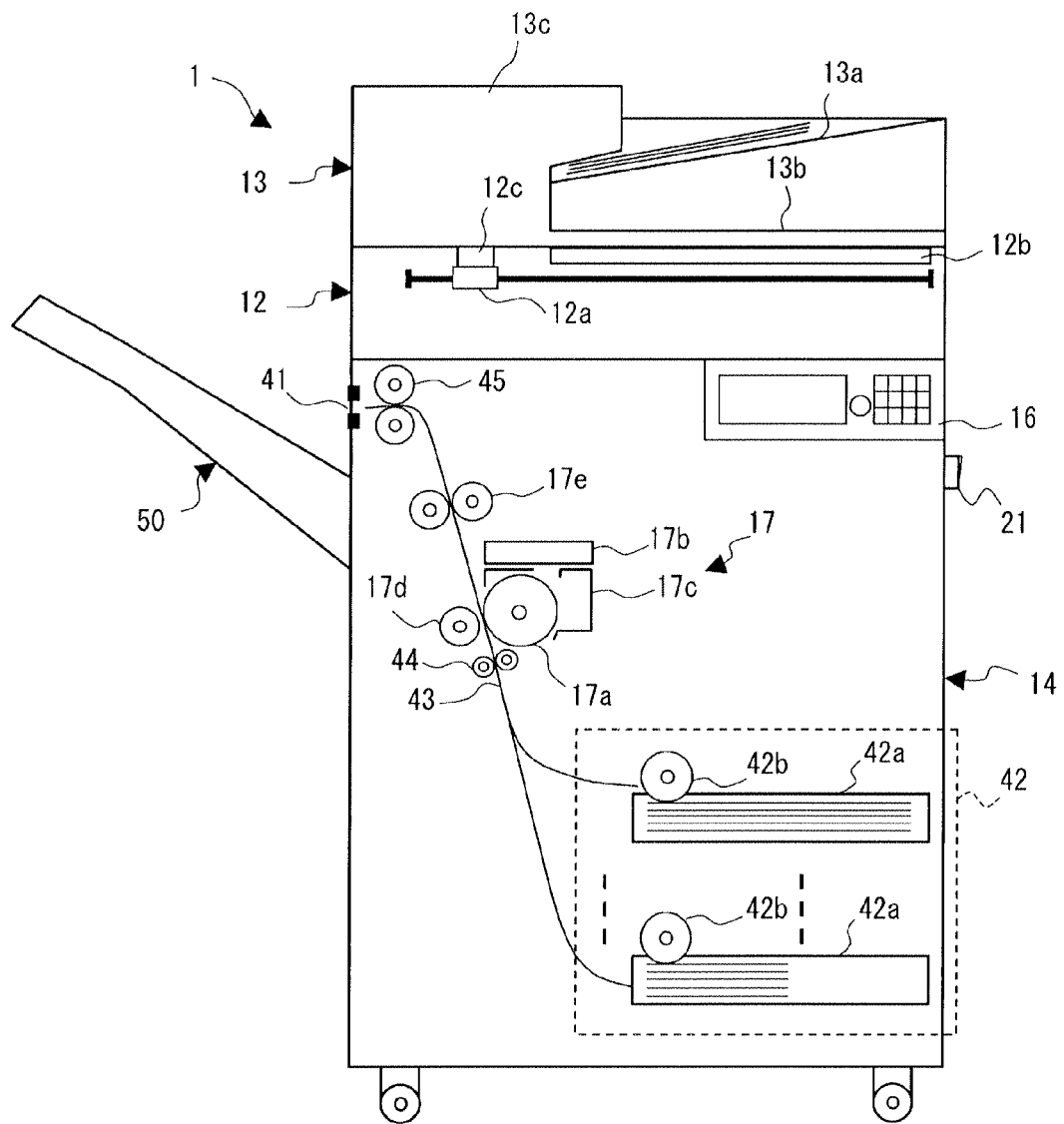
FIG. 2 schematically illustrates the image forming apparatus in FIG. 1.

Power supply from the main power source to the power supply unit 20 is enabled and disabled manually with a main power source switch 21 (see FIG. 2).

The control unit 10 and image processing unit 11 in the image forming apparatus 1 may be integrated into one member like a CPU incorporated into a GPU and a chip-on module package.

The control unit 10 and image processing unit 11 may incorporate a RAM, a ROM, a flash memory, and the like.

Next the operation of the image forming apparatus 1 according to an embodiment of the present disclosure will be described with reference to FIG. 2.

The original reading unit 12 is placed on a main body 14. The original supply unit 13 is placed on the original reading unit 12. The stack tray 50 is disposed near a discharge port 41, formed in the main body 14, from which recoding sheets are discharged. The manipulation panel 16 is disposed on the front of the image forming apparatus 1.

The original reading unit 12 includes a scanner 12a, a platen glass plate 12b, and an original reading slit 12c. The scanner 12a is formed with an exposure lamp, a charge coupled device (CCD) or complementary metal oxide semiconductor (CMOS) imaging sensor, and other components. The scanner 12a is structured so as to be movable in a direction in which an original is conveyed by the original supply unit 13.

The platen glass plate 12b is an original glass plate made of glass or another transparent material. The original reading slit 12c is formed in a direction orthogonal to the direction in which an original is conveyed by the original supply unit 13.

When an original placed on the platen glass plate 12b is to be read, the scanner 12a is moved to a position at which the scanner 12a faces the platen glass plate 12b, reads the original placed on the platen glass plate 12b to obtain image data while scanning the original, and outputs the obtained image data to the control unit 10 (see FIG. 1) in the main body 14.

When an original conveyed by the original supply unit 13 is to be read, the scanner 12a is moved to a position at which the scanner 12a faces the original reading slit 12c, reads the original through the original reading slit 12c in synchronization with an original conveying operation by the original supply unit 13, and outputs the obtained image data to the control unit 10 in the main body 14.

The original supply unit 13 is formed with an original placement portion 13a, an original discharge portion 13b, and an original conveying mechanism 13c. Originals placed on the original placement portion 13a are sequentially fed by the original conveying mechanism 13c one at a time. Each fed original is conveyed to a position at which the original faces the original reading slit 12c and is then discharged to the original discharge portion 13b.

The original supply unit 13 has folding structure. When the original supply unit 13 is lifted, the upper surface of the platen glass plate 12b is exposed.

The main body 14 includes the image forming unit 17, a sheet supply unit 42, a sheet conveying path 43, the conveying roller pair 44, and the discharge roller pair 45. The sheet supply unit 42 includes a plurality of sheet supply cassettes 42a and a plurality of sheet supply rollers 42b. The plurality of sheet supply cassettes 42a store sheets in different sizes or sheets oriented in different directions. Each of sheet supply rollers 42b feeds recording sheets one at a time from the relevant sheet supply cassette 42a to the sheet conveying path 43. The sheet supply rollers 42b, conveying roller pair 44, and discharge roller pair 45 functions as a conveying unit. Recording sheets are conveyed by the conveying unit.

A recording sheet fed to the sheet conveying path 43 by the sheet supply roller 42b is conveyed to the image forming unit 17 by the conveying roller pair 44. The recording sheet is then subject to recording in the image forming unit 17 and is discharged to the stack tray 50 by the discharge roller pair 45.

The image forming unit 17 includes a photosensitive drum 17a, an exposure unit 17b, a developing unit 17c, a transfer unit 17d, and a fixing unit 17e. The exposure unit 17b is an optical unit having a laser, a mirror, a lens, a light-emitting diode (LED) array, and other components. The exposure unit 17b outputs light or the like according to the image data to expose the photosensitive drum 17a to the light and forms an electrostatic latent image on the surface of the photosensitive drum 17a. The developing unit 17c uses toner to develop the electrostatic latent image formed on the photosensitive drum 17a. Specifically, the developing unit 17c forms a toner image on the photosensitive drum 17a based on the electrostatic latent image. The transfer unit 17d transfers, to a recording sheet, the toner image formed on the photosensitive drum 17a by the developing unit 17c. The fixing unit 17e heats the recording sheet, to which the toner image has been transferred by the transfer unit 17d, to fix the toner image to the recording sheet.

The main power source switch 21 turns on and off power supply from the main power source such as an AC power supply. When the main power source switch 21 is turned on from the turned-off state, electric power is supplied to the power supply unit 20 (see FIG. 1), after which initialization processing is performed by the control unit 10.

Figure 3:
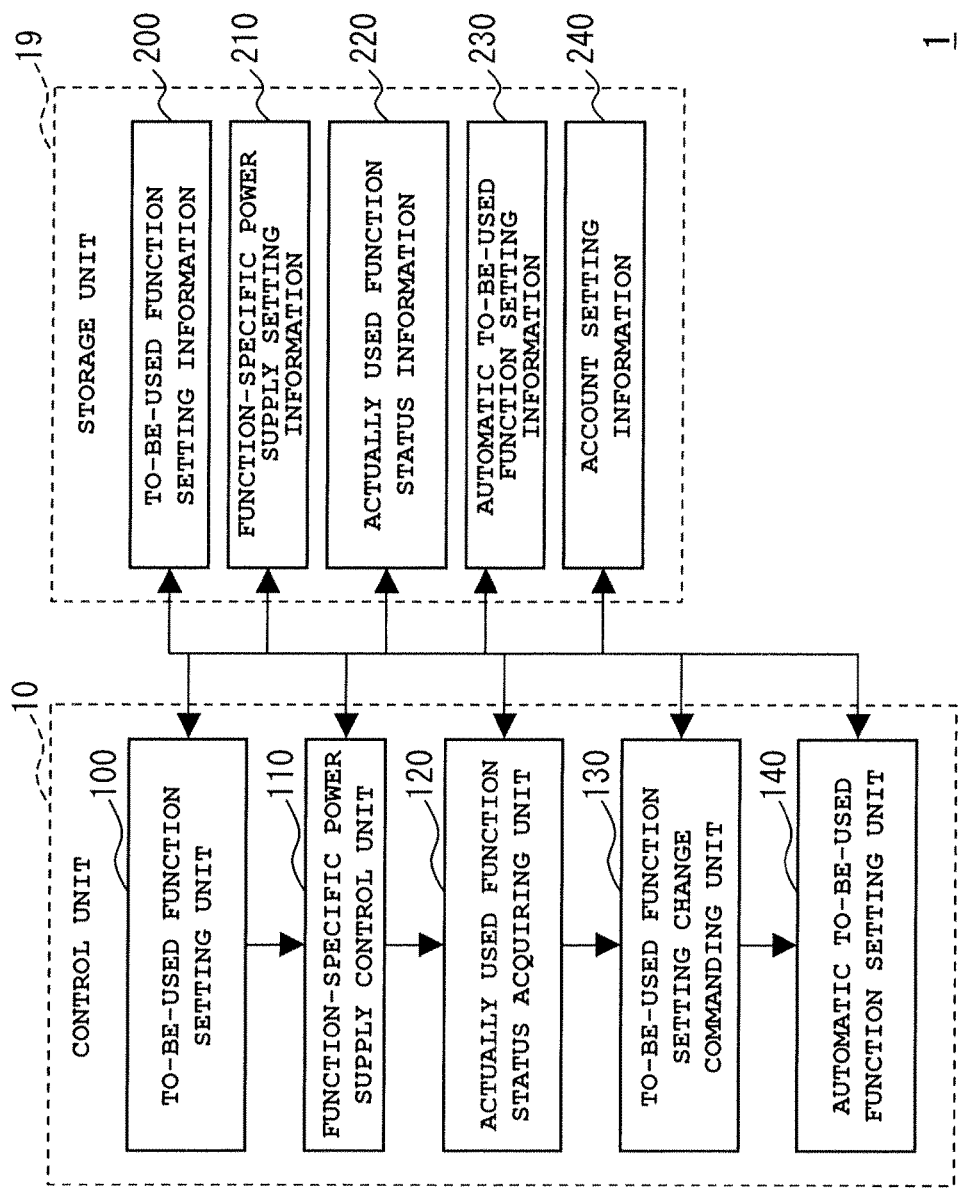
FIG. 3 illustrates the system structure of the image forming apparatus in FIG. 1.

Now the system structure of the image forming apparatus 1 will be described with reference to FIG. 3.

The control unit 10 in the image forming apparatus 1 includes a to-be-used function setting unit 100, a function-specific power supply control unit 110, an actually used function status acquiring unit 120, a to-be-used function setting change commanding unit 130, and an automatic to-be-used function setting unit 140.

The storage unit 19 stores to-be-used function setting information 200, function-specific power supply setting information 210, actually used function status information 220, automatic to-be-used function setting information 230, and account setting information 240.

The to-be-used function setting unit 100 sets functions to be used when the main power source is turned on. The to-be-used function setting unit 100 also stores the set functions in the to-be-used function setting information 200.

Examples of functions that can be set in the to-be-used function setting unit 100 include the following: a copy function that reads an original and outputs it to a recording sheet; a facsimile function that performs facsimile transmission and reception; other transmission functions that, for example, transmit a document from a document box or another place to the terminal 2 or a server (not illustrated) and perform network scanning between the image forming apparatus 1 and the terminal 2 through the network 5; and a print function that sends an output from the terminal 2, a document box, or an external storage medium (not illustrated) to a recording sheet.

The function-specific power supply control unit 110 reads outs the to-be-used function setting information 200 that has been set by the to-be-used function setting unit 100. The function-specific power supply control unit 110 also controls the power supply unit 20 to supply, when the main power source is turned on, electric power to constituent units that need power in correspondence to a function that has been set in the to-be-used function setting information 200. The function-specific power supply control unit 110 also controls the power supply unit 20 to supply electric power to constituent units that need power in correspondence to a function that has not been set in the to-be-used function setting information 200 when the function that has not been set is selected after turning-on the main power source.

The function-specific power supply control unit 110 also determines whether the activation has been caused because the main power source has been turned on or a user has issued a command or the like in an idle state rather than the above state.

The actually used function status acquiring unit 120 acquires information about the setting of functions that have been actually used when the main power source has been turned on. The actually used function status acquiring unit 120 stores the acquired information about the setting of these functions as the actually used function status information 220.

The to-be-used function setting change commanding unit 130 reads out the actually used function status information 220 that is the information acquired by the actually used function status acquiring unit 120 about the setting of the actually used functions. The unit 130 further notifies or prompts the user to change functions set by the to-be-used function setting unit 100 according to the actually used function status information 220. The to-be-used function setting change commanding unit 130 may display a notification to the user on, for example, the manipulation panel 16 or the display unit of the terminal 2.

The automatic to-be-used function setting unit 140 reads out the actually used function status information 220 acquired by the actually used function status acquiring unit 120 about the setting of the actually used functions. The automatic to-be-used function setting unit 140 also sets functions to be used when the main power source is turned on. Specifically, the automatic to-be-used function setting unit 140 sets a change that it has made in the to-be-used function setting information 200.

The to-be-used function setting information 200 is information in which functions to be used within a particular time after the main power source is turned on are set. In the to-be-used function setting information 200, settings such as "NOT USED", "NOT USED IMMEDIATELY", "USED IMMEDIATELY", and "AUTO-SETTING", for example, are set for each function, of the image forming apparatus 1, that can be set by the to-be-used function setting unit 100.

The function-specific power supply setting information 210 is information in which settings are made for each function of the image forming apparatus 1 that can be set by the to-be-used function setting unit 100 as to whether electric power is supplied to the constituent units related to the function.

FIG. 4 illustrates an example of the function-specific power supply setting information 210. For each constituent unit in FIG. 4, "POWER SUPPLY" indicates that electric power is supplied, and a blank indicates that electric power is not supplied immediately after the main power source is turned on. In the example in FIG. 4, therefore, when "NOT USED" takes effect, electric power is supplied to none of the constituent units. Even if "NOT USED IMMEDIATELY" takes effect, electric power is supplied to, for example, the manipulation panel 16, in which case the user may make the relevant function selectable immediately. When "USED IMMEDIATELY" takes effect, electric power is supplied to the constituent units that are necessary to operate the relevant function.

When "AUTO-SETTING" takes effect, the automatic to-be-used function setting unit 140 may determine which of the settings—"NOT USED", "NOT USED IMMEDIATELY", and "USED IMMEDIATELY"—takes effect for each function and electric power may be supplied to constituent units according to the determined setting.

The actually used function status information 220 is information, acquired by the actually used function status acquiring unit 120, that includes histories of functions of the image forming apparatus 1 that have been used within a particular time after the main power source has been turned on, the number of times these functions have been used, and other information.

The automatic to-be-used function setting information 230 is information about settings corresponding to automatic setting performed by the automatic to-be-used function setting unit 140. Settings corresponding to automatic setting include particular times and other conditions under which the usage setting of the relevant function is acquired after the main power source is turned on. The particular times within which the usage setting is acquired may include a first particular time that is suitable for the user to issue a first command after the relevant constituent unit has been activated and a second particular time that is, for example, a setting of a power-saving timer that switches to a power-saving mode after the lapse of the setting when the user does nothing after the constituent unit has been activated. In this example, a time of several tens of seconds to several minutes may be set as the first particular time and a time of several minutes to several hours may be set as the second particular time, these times being measured after the main power source has been turned on. Alternatively, the length of working hours set in, for example, a weekly timer, a date, or the like may be set as the second particular time. The conditions under which the usage setting is acquired may include the number of times the user has used the function within the first particular time or second particular time and other settings. The automatic to-be-used function setting information 230 may include, for example, a particular period during which a determination is made as to whether to change a setting in the actually used function status information 220 or whether to validate automatic setting. A period of several days to several months may be set as the particular period.

The account setting information 240 includes authentication information including a user ID, a particular password, and the like, authority information, address information, and billing information for each account of each user. The user ID is identification (ID) of the user, a user number, the name of the user, or other information. The password and the like are a password and a sign entered during user authentication, biometric authentication, and other information. The authority information is information involved in the authority of a manager (authorized user), an ordinary user, a guest user, or another user. The address information includes an electronic mail address of the user, an Internet Protocol (IP) address, an address book, a telephone number, a facsimile number, the address of a document box, and the like. The billing information is information used to make a charge, for example, for each page in monochrome printing and color printing. The billing information may include information about billing and the like at shops and information about network printing and the like, besides billing for pages.

The control unit 10 in the image forming apparatus 1 functions as the to-be-used function setting unit 100, function-specific power supply control unit 110, actually used function status acquiring unit 120, to-be-used function setting change commanding unit 130, and automatic to-be-used function setting unit 140 by executing the control program stored in the storage unit 19.

Each constituent unit in the image forming apparatus 1 is a hardware resource that executes an image forming method in the present disclosure.

Figure 5:
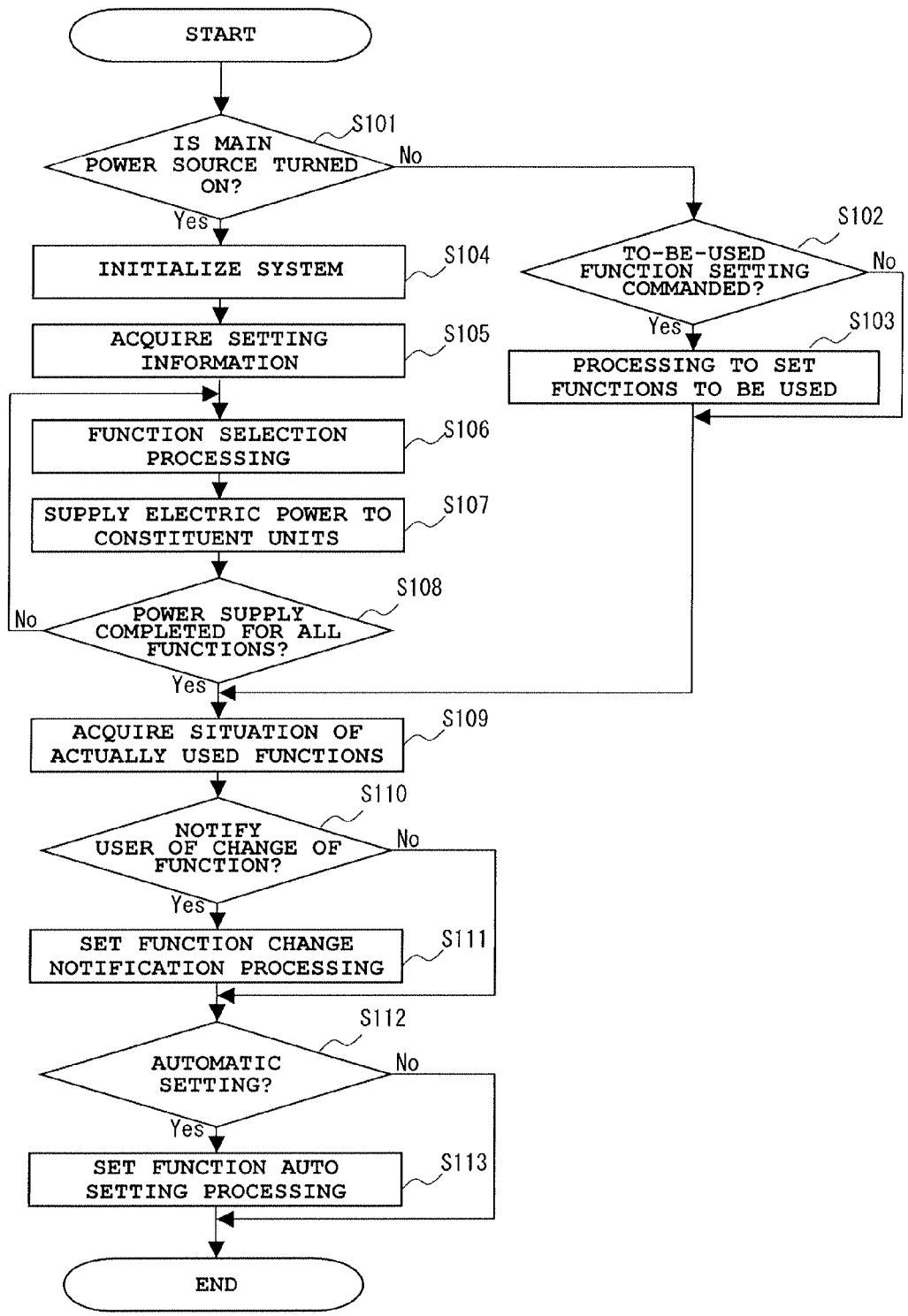

Next power supply control processing, according to an embodiment of the present disclosure, executed when the main power source is turned on will be described with reference to FIGS. 5 to 7. The processing is executed by the image forming apparatus 1.

In the power supply control processing, according to the present disclosure, executed when the main power source is turned on, functions to be used when the main power source is turned on are managed as commanded by the user in correspondence to power supply control so that activation of constituent units involved in functions that are not immediately necessary is suppressed. Even when functions to be used have been set by the user, if the setting used by the user does not match the current setting, a prompt for the user to change the setting is generated. It is also possible to perform automatic setting for functions to be used when the main power source is turned on.

The power supply control processing, according to the present disclosure, executed when the main power source is turned on is mainly executed by the control unit 10. In the processing, the control unit 10 executes programs stored in the storage unit 19 in collaboration with individual constituent units by using hardware resources.

The power supply control processing executed when the main power source is turned on will be described in detail on a step-by-step basis with reference the flowchart in FIG. 5.

First, in step S101, the control unit 10 causes the function-specific power supply control unit 110 to determine whether the activation has been caused because the main power source has been turned on. If the main power source switch 21 is turned on, electric power is supplied from the power supply unit 20 to the control unit 10, and the control unit 10 is initialized. The control unit 10 then determines that the activation has been carried out because the main power source has been turned on, thereby producing a "Yes" result. If, for example, the control unit 10 returns from a sleep state or another power-saving state because the user has issued a command or the like in another state such as an idle state, the control unit 10 determines that the activation has been carried out because the main power source has been turned on and produces a "No" result.

If the result is "Yes", the control unit 10 causes the sequence to proceed to step S104.

If the result is "No", the control unit 10 causes the sequence to proceed to step S102.

If the activation is not an activation that has been carried out because the main power source has been turned on, the control unit 10 determines in step S102 whether the to-be-used function setting unit 100 has commanded the to-be-used function setting information 200 to be set. If a command to set the to-be-used function setting information 200 is issued by pressing a button or the like on the manipulation panel 16 or from, for example, the input unit of the terminal 2, the control unit 10 produces a "Yes" result. Otherwise, the control unit 10 produces a "No" result.

If the result is "Yes", the control unit 10 causes the sequence to proceed to step S103.

If the result is "No", the control unit 10 causes the sequence to proceed to step S109.

If a command to set the to-be-used function setting information has been issued, the control unit 10 causes in step S103 the to-be-used function setting unit 100 to perform processing to set functions to be used when a main power source is turned on.

The control unit 10 displays a setting screen on which the to-be-used function setting information 200 is set on the manipulation panel 16 and the display unit of the terminal 2.

Figure 6:
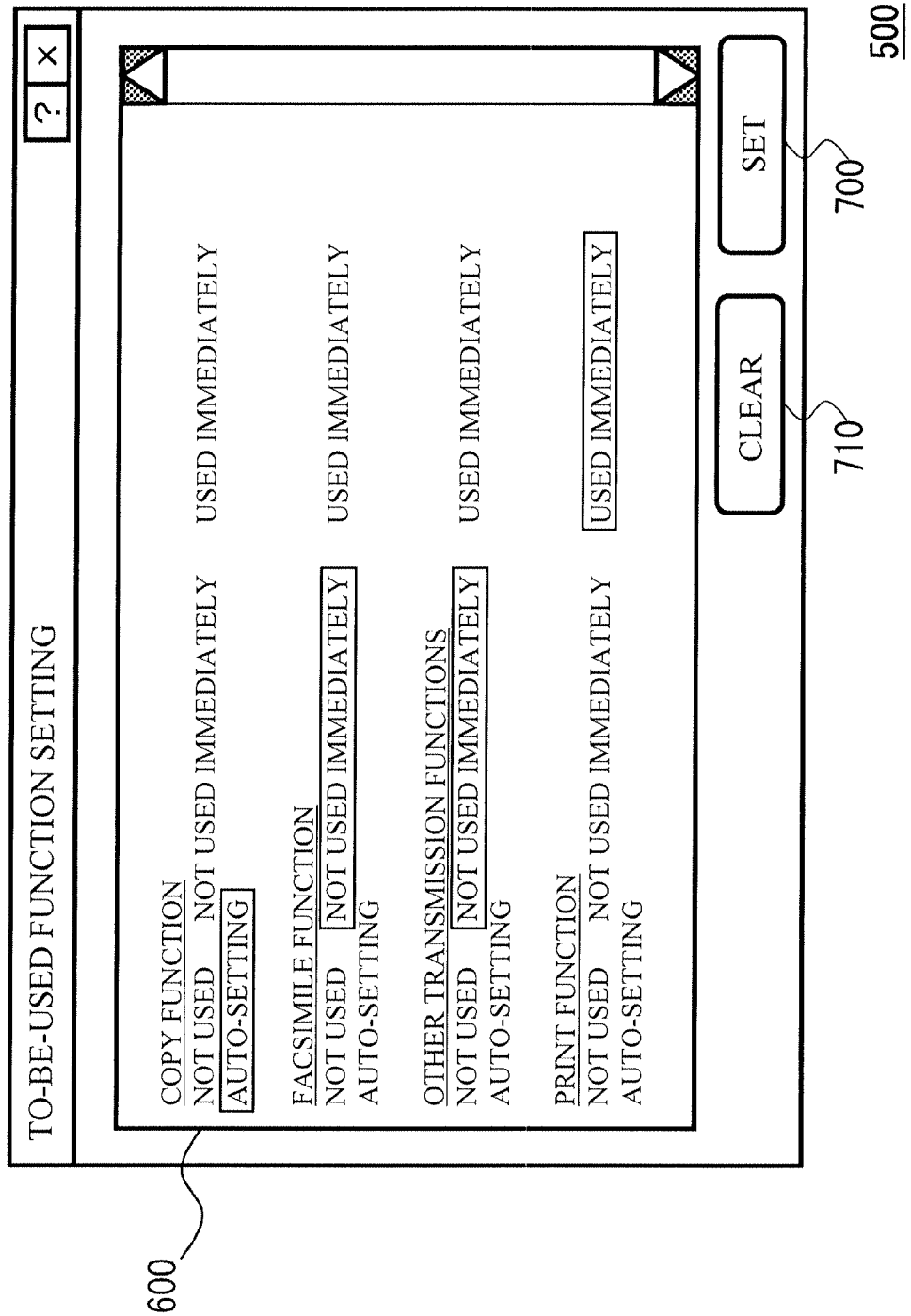
FIG. 6 illustrates an example of a setting screen for setting functions in to-be-used function setting processing of turning-on the main power source illustrated in FIG. 5.

On an exemplary screen 500 shown in FIG. 6, the user selects, "NOT USED", "NOT USED IMMEDIATELY", "USED IMMEDIATELY" or another level in a display field 600 on, for example, a touch panel for each function to be used when the main power source is turned on. Alternatively, the user may select "AUTO-SETTING" on, for example, a touch panel. After the user has completed the selection, if the control unit 10 detects a press of a setting button 700, the control unit 10 reflects the selection into the to-be-used function setting information 200 stored in the storage unit 19. If the control unit 10 detects a press of a clear button 710, the control unit 10 reads out settings of the to-be-used function setting information 200 from the storage unit 19 and displays these settings.

Upon the completion of the setting, the control unit 10 causes the sequence to proceed to step S109.

The control unit 10 may authenticate the user with reference to the account setting information 240 and may check whether the user is an authorized user. Only if the user is an authorized user, the control unit 10 may cause the to-be-used function setting unit 100 to set functions to be used.

If the activation is an activation that has been carried out because the main power source has been turned on, the control unit 10 in step S104 causes the function-specific power supply control unit 110 to initialize the system.

The control unit 10 loads from the storage unit 19 a control program that is executed when the main power source is turned on, executes various initialization codes in the control program, and performs tests and the like for individual constituent units.

Next, in step S105, the control unit 10 causes the function-specific power supply control unit 110 to perform processing to acquire setting information about functions to be used when the main power source is turned on.

The control unit 10 reads out the to-be-used function setting information 200 and function-specific power supply setting information 210 from the storage unit 19.

In step S106, the control unit 10 causes the function-specific power supply control unit 110 to perform function selection processing.

The control unit 10 selects from the to-be-used function setting information 200 one of the functions to be used when the main power source is turned on. The control unit 10 also selects constituent units that need electric power, according to the setting of the selected function, that is, "NOT USED", "NOT USED IMMEDIATELY", or "USED IMMEDIATELY", with reference to the function-specific power supply setting information 210.

If the setting of the selected function is "AUTO SETTING", the control unit 10 reads out the actually used function status information 220 and determines which of the settings "NOT USED", "NOT USED IMMEDIATELY", and "USED IMMEDIATELY" takes effect for the selected function. On the basis of this determination, the control unit 10 selects from the function-specific power supply setting information 210, the constituent units that need power supply.

Next, in step S107, the control unit 10 causes the function-specific power supply control unit 110 to perform processing to supply electric power to relevant constituent units.

The control unit 10 controls the power supply unit 20 to supply electric power to constituent units that correspond to the selected function and to which electric power needs to be supplied. After electric power has been supplied, the control unit 10 initializes the constituent units that need electric power and performs other processing on them.

If electric power has been already supplied to a unit, the control unit 10 may not supply electric power to the constituent unit.

Next, in step S108, the control unit 10 determines whether the function-specific power supply control unit 110 has completed supplying power for all functions.

Specifically, the control unit 10 selects, from the to-be-used function setting information 200, all functions to be used when the main power source is turned on. If power supply to the relevant constituent units has been completed, the control unit 10 produces a "Yes" result. Otherwise, if power supply is still needed for other functions, the control unit 10 produces a "No" result.

If the result is "Yes", the control unit 10 causes the sequence to proceed to step S109.

If the result is "No", the control unit 10 causes the sequence to return to step S106, where the control unit 10 selects another function and supplies electric power to the relevant constituent units.

In step S109, the control unit 10 causes the actually used function status acquiring unit 120 to perform processing to acquire a setting of actually used functions.

The control unit 10 acquires information indicating which functions have been used in the first particular time and in the second particular time indicated in the automatic to-be-used function setting information 230.

The control unit 10 stores in the actually used function status information 220 information about the actually used functions. The information has been acquired when the main power source has been turned on, as a log or the like. In this case, for each function, the control unit 10 may acquire the number of times the function has been used, a frequency at which the function has been used, and other statistical information. For each user, the control unit 10 may acquire information indicating that which function has been used.

Next, in step S110, for each function in the to-be-used function setting information 200, the control unit 10 determines whether the to-be-used function setting change commanding unit 130 should notify the user that the function has been changed. If "USED IMMEDIATELY" is set for a particular function, when the function has not been used within the first particular time of activation at least a particular number of times in a particular period, the control unit 10 produces a "Yes" result. If "NOT USED IMMEDIATELY" is set for a particular function, when the function has not been used at all within the second particular time of activation in a particular period, the control unit 10 also produces a "Yes" result. If "NOT USED" or "NOT USED IMMEDIATELY" is set for a particular function, when the function has been used at least a particular number of times within the first particular time in a particular period, the control unit 10 also produces a "Yes" result. In other cases, when the control unit 10 determines that there is no need to generate a function change notification, the control unit 10 produces a "No" result.

If the result is "Yes", the control unit 10 causes the sequence to proceed to step S111.

If the result is "No", the control unit 10 causes the sequence to proceed to step S112.

If the control unit 10 determines that there is a need to generate a function change notification, the control unit 10 causes, in step S111, the to-be-used function setting change commanding unit 130 to perform set function change notification processing.

If "USED IMMEDIATELY" is set for a particular function, when the function has not been used within the first particular time of activation at least a particular number of times in a particular period, the control unit 10 displays a setting screen on the manipulation panel 16 and the display unit of the terminal 2. The unit 10 also notifies the user that a change from "USED IMMEDIATELY" to "NOT USED" is recommended. If "NOT USED IMMEDIATELY" is set for a particular function, when the function has not been used at all within the second particular time of activation in a particular period, the control unit 10 similarly notifies the user that a change to "NOT USED" is recommended. If "NOT USED" or "NOT USED IMMEDIATELY" is set for a particular function, when the function has been used at least a particular number of times within the first particular time in a particular period, the control unit 10 similarly notifies the user that a change to "USED IMMEDIATELY" is recommended.

Figure 7:
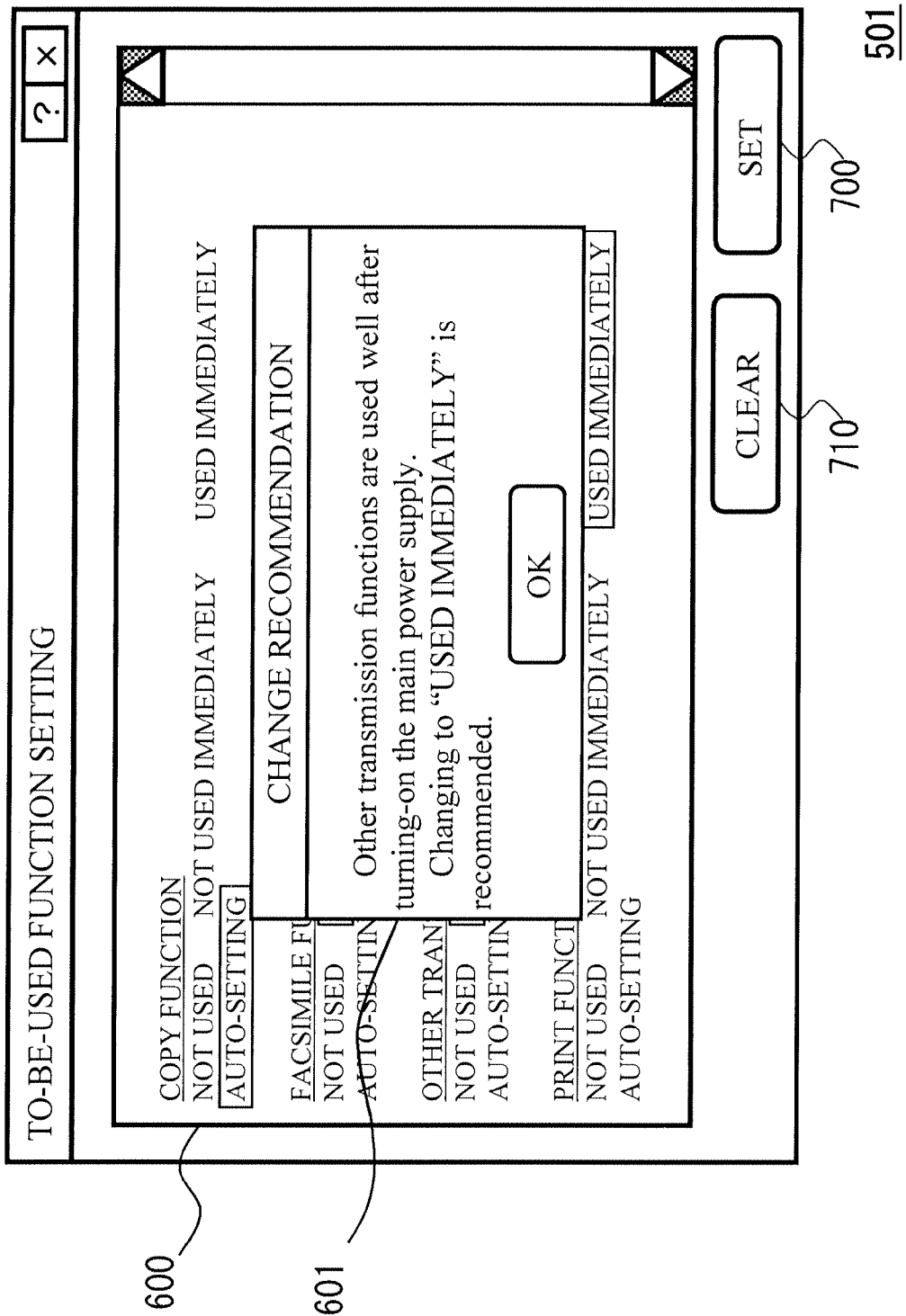
FIG. 7 illustrates an example of a screen on which a notification of a change in a function setting in FIG. 6 is indicated.

The screen 501 in FIG. 7 indicates an example of a display field 601 in a dialog box that is displayed when "NOT USED IMMEDIATELY" is set for other transmission functions, but the functions have been used at least a particular number of times within the first particular time in a particular period.

In step S112, the control unit 10 determines whether the automatic to-be-used function setting unit 140 should perform automatic setting. If any of the settings for a function in the to-be-used function setting information 200 is "AUTO-SETTING", the control unit 10 produces a "Yes" result. Otherwise, the control unit 10 produces a "No" result.

If the result is "Yes", the control unit 10 causes the sequence to proceed to step S113.

If the result is "No", the control unit 10 terminates the power supply control processing executed when the main power source is turned on.

When automatic setting is to be performed, the control unit 10 causes in step S113 the automatic to-be-used function setting unit 140 to perform set function auto setting processing.

The control unit 10 references the actually used function status information 220 and automatic to-be-used function setting information 230 and determines that a function for which "AUTO-SETTING" is set in the actually used function status information 220 corresponds to which setting of a function in the to-be-used function setting information 200. Specifically, the control unit 10 determines that the function is applicable to, for example, any of "NOT USED", "NOT USED IMMEDIATELY", and "USED IMMEDIATELY". If, for example, the function has not been used within the first particular time of activation at least a particular number of times in a particular period, the control unit 10 determines that the setting "NOT USED" or "NOT USED IMMEDIATELY" is applicable. If, for example, the function has not been used at all within the second particular time of activation in a particular period, the control unit 10 determines that the setting "NOT USED" is applicable. If, for example, the function has been used at least a particular number of times within the first particular time in a particular period, the control unit 10 determines that the setting "USED IMMEDIATELY" is applicable.

The control unit 10 stores this determination result in the actually used function status information 220.

Then power supply control processing, according to an embodiment of the present disclosure, is executed when the main power source is terminated.

When the image forming apparatus 1 is structured as described above, the effects as described below can be obtained.

The image forming apparatus 1 in an embodiment of the present disclosure can control the power supply for each constituent unit. To control the power supply to each constituent unit, the image forming apparatus 1 includes the to-be-used function setting unit 100 and the function-specific power supply control unit 110. The to-be-used function setting unit 100 sets functions to be used when a main power source is turned on. The function-specific power supply control unit 110 controls the power supply unit 20 to supply electric power to constituent units that need power supplied in correspondence to a function that is set by the to-be-used function setting unit 100. The function-specific power supply control unit 110 also controls the power supply unit 20 to supply electric power to constituent units that need power supplied in correspondence to a function that has not been set by the to-be-used function setting unit 100 when the function that has not been set is selected after turning on the main power source.

When the image forming apparatus 1 is structured as described above, even if the user has not yet selected a function because the main power source has just been turned on or the user has not yet logged in, for example, power supply to constituent units can be controlled individually. Accordingly, if the print function is not used immediately after the main power source has been turned on, electric power does not need to be supplied to a heater in the fixing unit 17e, which consumes a large amount of electric power, thereby preventing an increase in wasteful power consumption. Accordingly, the power-saving efficiency can be increased and costs can be reduced.

When setting functions in response to commands from the user, the image forming apparatus 1 in this embodiment can set different levels such as "NOT USED", "NOT USED IMMEDIATELY", and "USED IMMEDIATELY" for these functions. If "NOT USED IMMEDIATELY" is set for the copy function, it ceases to supply electric power only to the manipulation panel 16. For the facsimile function, it ceases to supply electric power only to the facsimile transmission and reception unit 18 and the like. For other transmission functions, it ceases to supply electric power only to the network transmission and reception unit 15 and the like. For the print function, it ceases to supply electric power only to the network transmission and reception unit 15. Alternatively, if "USED IMMEDIATELY" is set, electric power is supplied to these constituent units and other constituent units that need power supplied. Thus, flexible settings can be made.

As a result, the power-saving efficiency can be increased and costs can be reduced.

The image forming apparatus 1 in an embodiment of the present disclosure also includes the actually used function status acquiring unit 120 and the to-be-used function setting change commanding unit 130. The actually used function status acquiring unit 120 acquires a setting of functions that have been actually used when the main power source has been turned on. The to-be-used function setting change commanding unit 130 notifies the user to change functions set by the to-be-used function setting unit 100 according to the setting of the functions, the setting having been acquired by the actually used function status acquiring unit 120.

When the image forming apparatus 1 is structured as described above, even if settings in the to-be-used function setting information 200, which have been set by the user, do not match how the functions are being actually used, a recommendation can be made to the user to change settings according to how the user is using the functions. Accordingly, the power-saving efficiency can be increased and costs can be reduced.

When the user is notified through the manipulation panel 16, the terminal 2, and the like, it is possible to prevent behaviors unpredictable to the user and control power supply to individual constituent units in an energy-saving manner, as intended by the user.

The image forming apparatus 1 in an embodiment of the present disclosure also includes the automatic to-be-used function setting unit 140, which sets functions to be used when the main power source is turned on according to the setting of the functions. The setting of the functions is obtained by the actually used function status acquiring unit 120.

When the image forming apparatus 1 is structured as described above, if the user selects "AUTO-SETTING" for the setting of functions to be used by the user when the main power source is turned on, individual constituent units can be appropriately controlled.

Even if the user does not log in, for example, automatic control is carried out according to functions of the image forming apparatus 1 that have been used for a particular time in a particular period. As a result, efficiency of power supply control can be increased.

An embodiment of the present disclosure has been described for relationships between the settings of "NOT USED", "NOT USED IMMEDIATELY", "USED IMMEDIATELY" and "AUTO-SETTING" and the constituent units of the image forming apparatus 1 for the copy function, facsimile function, other transmission functions, and print function indicated in the function-specific power supply setting information 210, as well as for examples of processing according to "AUTO-SETTING", a particular time, and conditions. However, the present disclosure is not limited to these relationships. For example, the control unit 10 may use functions of the image forming apparatus 1 to make settings. Instead of simply selecting "NOT USED", "NOT USED IMMEDIATELY", or "USED IMMEDIATELY", a time during which electric power is supplied to a constituent unit may be changed according to, for example, a statistical frequency of use. Alternatively, a time during which electric power is supplied to a constituent unit may be changed for each user. When "AUTO-SETTING" takes effect, settings as to whether to supply electric power to constituent units that have been used may be retained instead of supplying electric power to constituent units for each function according to the settings "NOT USED", "NOT USED IMMEDIATELY", and "USED IMMEDIATELY".

When the image forming apparatus 1 is structured as described above, electric power can be more precisely supplied.

The present disclosure can also be applied to information processing apparatuses other than image forming apparatuses. For example, a server may be used to which a network scanner or a scanner is connected separately through a Universal Serial Bus (USB) cable or the like.

It should be understood that various changes and modifications to the embodiments described herein will be apparent to those skilled in the art. Such changes and modifications can be made without departing from the spirit and scope of the present subject matter and without diminishing its intended advantages. It is therefore intended that such changes and modifications be covered by the appended claims.

What is claimed is:

1. An electronic device comprising:
a power supply unit that supplies electric power to a constituent unit of the electronic device from a main power source;
a to-be-used function setting unit that sets a first function to be used when the main power source is turned on;
a function-specific power supply control unit that controls the power supply unit to
a) supply electric power to a constituent unit corresponding to the first function when the main power source is turned on and
b) supply electric power to a constituent unit corresponding to a second function that has not been set by the to-be-used function setting unit only when the second function is selected to be used by the user after turning on the main power source;
an actually used function status acquiring unit that acquires a setting of a function that has been actually used within a first particular time after the main power source has been turned on; and
a to-be-used function setting change commanding unit that notifies a user to change the first function set by the to-be-used function setting unit according to the setting of the function acquired by the actually used function status acquiring unit, wherein
the first particular time is suitable for the user to issue a first command after the constituent unit corresponding to the first function has been activated,
the to-be-used function setting change commanding unit notifies the user to change the setting of the second function to the setting of the first function when the second function has been used at least a first particular number of times within the first particular time in a particular period,
the to-be-used function setting change commanding unit notifies the user to change the setting of the first function to the setting of the second function when the first function has not been used within the first particular time of activation at least a second particular number of times in the particular period, but used within a second particular time of activation in the particular period, wherein the second particular time is longer than the first particular time.

2. The electronic device according to claim 1, further comprising an automatic to-be-used function setting unit that automatically sets the first function to be used when the main power source is turned on according to the setting of the function.

3. The electronic device according to claim 1 comprises an image forming apparatus.

4. The electronic device according to claim 1, wherein the second particular time switches to a power-saving mode after the lapse of the setting when the user does nothing after the constituent unit corresponding to the first function has been activated.

5. The electronic device according to claim 4, wherein
a setting for the second function can be one of "NOT USED" and "NOT USED IMMEDIATELY,"
the to-be-used function setting change commanding unit notifies the user to change the setting of the second function from "NOT USED IMMEDIATELY" to "NOT USED" when the second function has not been used within the second particular time of activation in the particular period.

6. A power supply control method comprising:
supplying, via a power supply unit, electric power to a constituent unit of an electronic device from a main power source;
setting, via a to-be-used function setting unit, a first function to be used when the main power source is turned on;
controlling, via a function-specific power supply control unit, the power supply unit to supply electric power to the constituent unit corresponding to the first function when the main power source is turned on;
controlling, via the function-specific power supply control unit, the power supply unit to supply electric power to the constituent unit corresponding to a second function that has not been set by the to-be-used function setting unit only when the second function is selected to be used by the user after turning on the main power source;
acquiring, via an actually used function status acquiring unit, a setting of a function that has been actually used within a first particular time after the main power source has been turned on; and
notifying, via a to-be-used function setting change commanding unit, a user to change the first function set by the to-be-used function setting unit according to the setting of the function acquired by the actually used function status acquiring unit, wherein
the first particular time is suitable for the user to issue a first command after the constituent unit corresponding to the first function has been activated,
the to-be-used function setting change commanding unit notifies the user to change the setting of the second function to the setting of the first function when the second function has been used at least a first particular number of times within the first particular time in a particular period,
the to-be-used function setting change commanding unit notifies the user to change the setting of the first function to the setting of the second function when the first function has not been used within the first particular time of activation at least a second particular number of times in the particular period, but used within a second particular time of activation in the particular period, wherein the second particular time is longer than the first particular time.

7. The power supply control method according to claim 6, further comprising automatically setting, via an automatic to-be-used function setting unit, the first function to be used when the main power source is turned on according to the setting of the function.

8. The power supply control method according to claim 7 wherein the setting may be "NOT USED," "NOT USED IMMEDIATELY," "USED IMMEDIATELY," or "AUTO-SETTING".

9. A non-transitory computer-readable recording medium that stores a power supply control program executable by a computer, the power supply control program comprising:
a first program code that causes a computer to set a first function to be used when a main power source is turned on;
a second program code that causes the computer to supply electric power to a constituent unit corresponding to the first function when the main power source is turned on;
a third program code that causes the computer to supply electric power to a constituent unit corresponding to a second function that has not been set by the first program code only when the second function is selected to be used by the user after turning on the main power source;

a fourth program code that causes the computer to acquire a setting of a function that has been actually used within a first particular time after the main power source has been turned on; and a fifth program code that causes the computer to notify a user to change the first function set by the first program code according to the setting of the function, the setting having been acquired by the fourth program code, wherein the first particular time is suitable for the user to issue a first command after the constituent unit corresponding to the first function has been activated, the fifth program code causes the computer to notify the user to change the setting of the second function to the setting of the first function when the second function has been used at least a first particular number of times within the first particular time in a particular period, the fifth program code causes the computer to notify the user to change the setting of the first function to the setting of the second function when the first function has not been used within the first particular time of activation at least a second particular number of times in the particular period, but used within a second particular time of activation in the particular period, wherein the second particular time is longer than the first particular time.

10. The non-transitory computer-readable recording medium according to claim 9, wherein the power supply control program further includes a sixth program code that causes the computer to automatically set the first function to be used when the main power source is turned on according to the setting of the function, the setting having been acquired by the fourth program code.

\* \* \* \* \*